United States Patent
Vick, Jr. et al.

(10) Patent No.: US 12,018,549 B2
(45) Date of Patent: Jun. 25, 2024

(54) GENERATOR DESIGN WITH VARYING GAP

(71) Applicant: Halliburton Energy Services, Inc., Houston, TX (US)

(72) Inventors: James Dan Vick, Jr., Dallas, TX (US); Richard Decena Ornelaz, Frisco, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 416 days.

(21) Appl. No.: 16/829,975

(22) Filed: Mar. 25, 2020

(65) Prior Publication Data

US 2020/0362671 A1 Nov. 19, 2020

(51) Int. Cl.
| | |
|---|---|
| *H02K 16/04* | (2006.01) |
| *E21B 41/00* | (2006.01) |
| *H02K 1/27* | (2022.01) |
| *H02K 16/02* | (2006.01) |

(52) U.S. Cl.
CPC ........... *E21B 41/0085* (2013.01); *H02K 1/27* (2013.01); *H02K 16/02* (2013.01); *H02K 16/04* (2013.01)

(58) Field of Classification Search
None
See application file for complete search history.

(56) References Cited

U.S. PATENT DOCUMENTS

| | | | |
|---|---|---|---|
| 5,586,083 A * | 12/1996 | Chin | E21B 47/18 |
| | | | 175/48 |
| 5,742,450 A | 4/1998 | Moser | |
| 6,545,382 B1 | 4/2003 | Bennett | |
| 2017/0234112 A1 | 8/2017 | Pawar et al. | |
| 2017/0248010 A1 | 8/2017 | Lee et al. | |

FOREIGN PATENT DOCUMENTS

| | | | | |
|---|---|---|---|---|
| DE | 102017101962 A1 * | 8/2018 | ............ | H02K 1/141 |
| EP | 2611007 | 7/2013 | | |
| JP | 2005016503 A * | 1/2005 | | |
| KR | 1020000016157 A | 3/2000 | | |
| WO | WO-9220131 A2 * | 11/1992 | ............ | H02K 16/00 |
| WO | WO-2014011175 A1 * | 1/2014 | ........ | E21B 41/0085 |
| WO | WO-2018009203 A1 * | 1/2018 | ............... | C09K 8/02 |
| WO | WO-2018153738 A1 * | 8/2018 | ............ | H02K 1/246 |

* cited by examiner

*Primary Examiner* — Thomas Truong
(74) *Attorney, Agent, or Firm* — Scott Richardson; Parker Justiss, P.C.

(57) ABSTRACT

A permanent magnet electric generator for use in downhole applications has a rotor element rotatable about an axis, extending in a radial direction generally perpendicular to the axis and one or more permanent magnets attached to the rotor for generating magnetic fields. A stator element also extends in a radial direction generally perpendicular to the axis. A shaft is connected to the rotor and rotatable about the axis, the shaft extends through the stator. The linear distance along the shaft between the rotor and stator defines a gap that is variable and resistant to debris buildup.

20 Claims, 8 Drawing Sheets

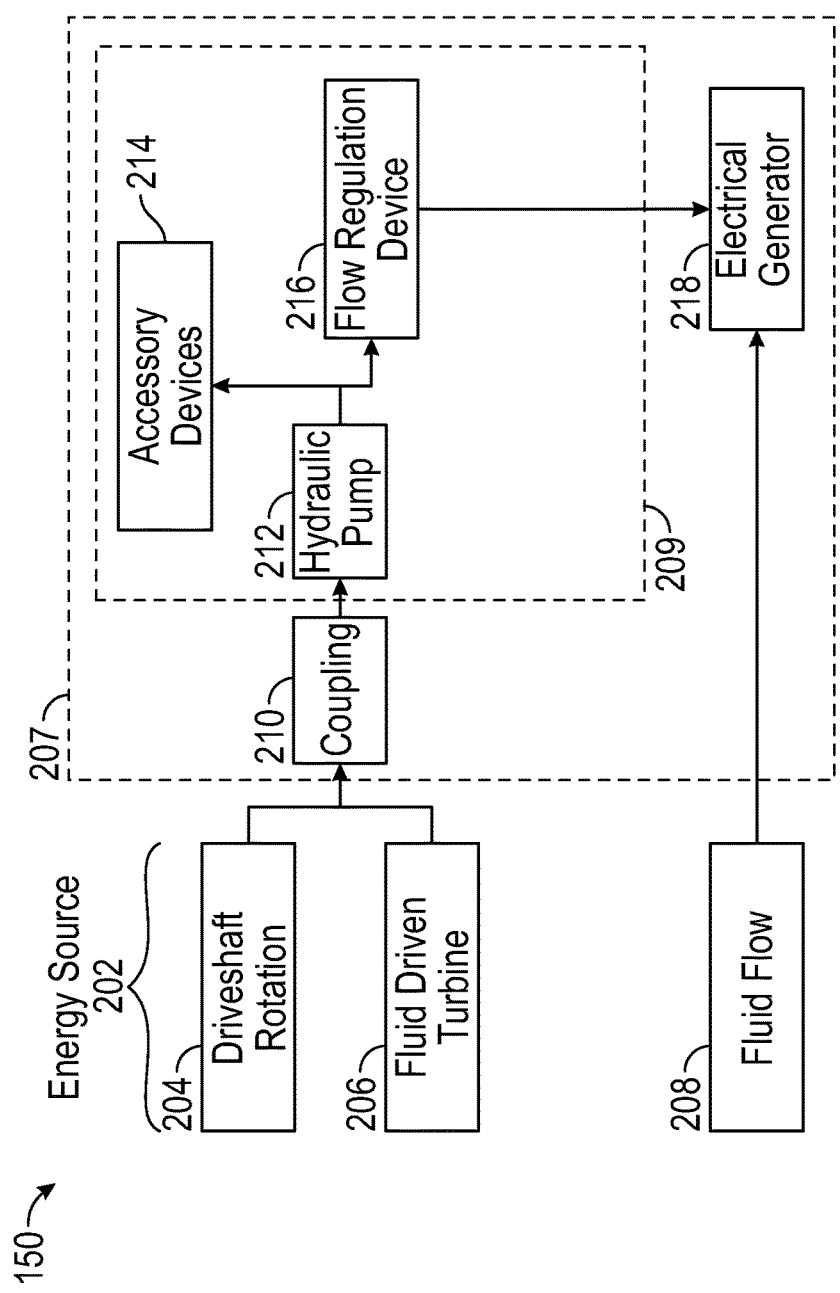
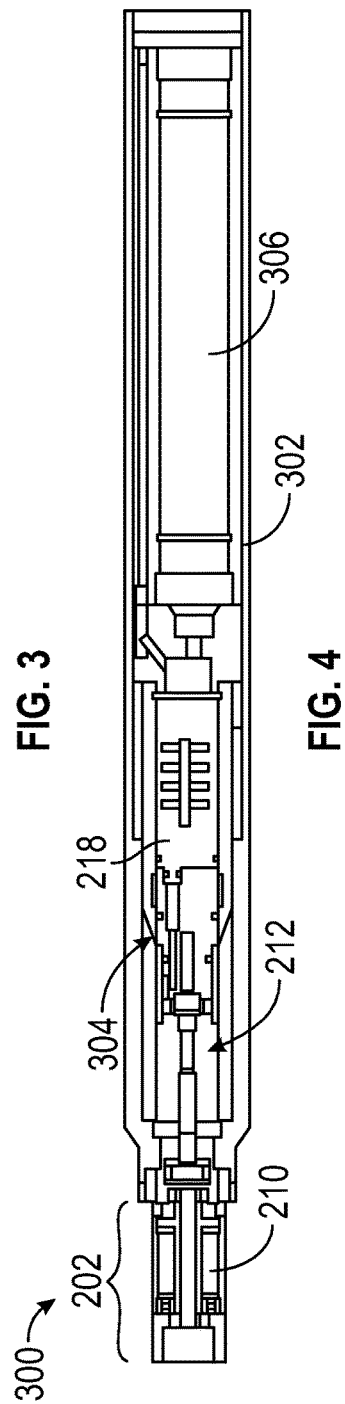
FIG. 3
FIG. 4

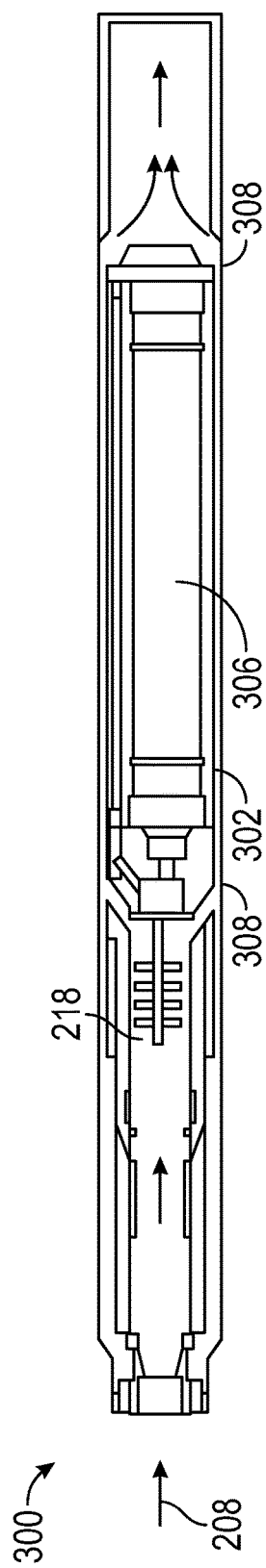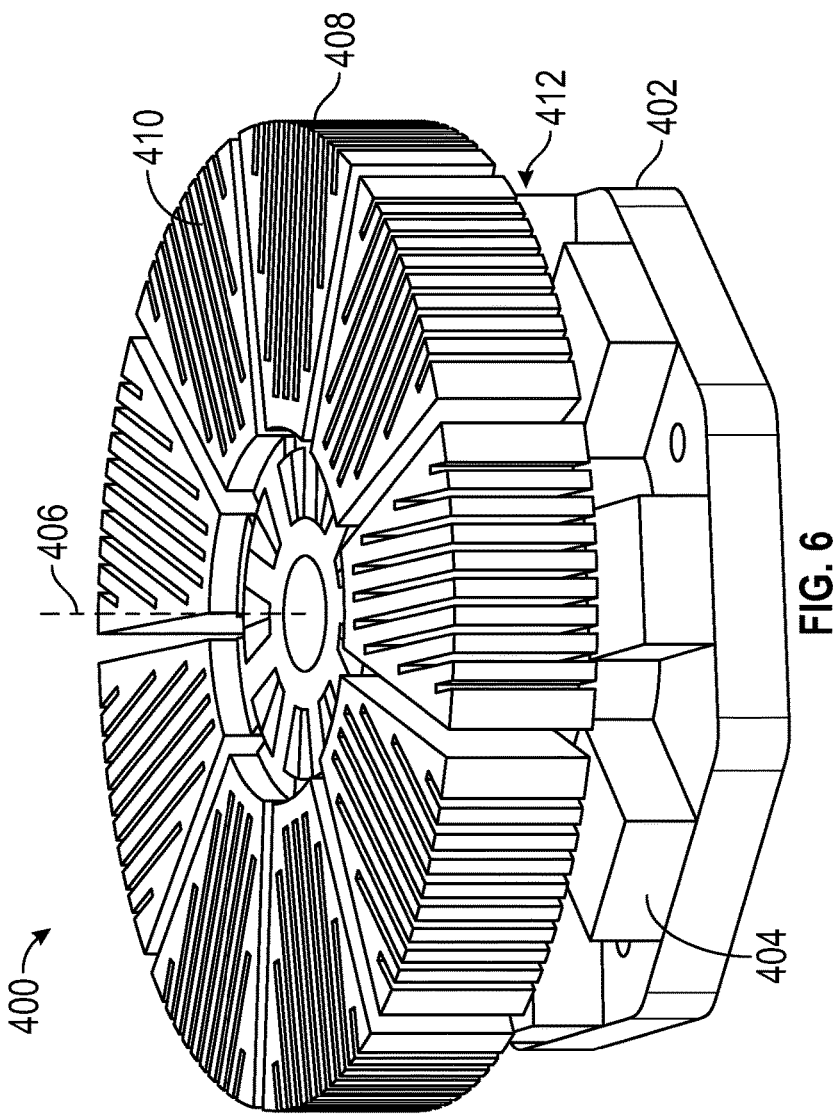

GENERATOR DESIGN WITH VARYING GAP

CROSS-REFERENCE TO RELATED APPLICATION

This application claims priority to International Application Serial No. PCT/US2019/032256, filed on May 14, 2019, entitled "GENERATOR DESIGN WITH VARYING GAP," commonly assigned with this application and incorporated herein by reference in its entirety.

BACKGROUND

The present disclosure relates generally to downhole power generation systems and methods and, more particularly, to downhole power generation systems and methods that utilize fluid flow to generate electrical power.

Modern hydrocarbon drilling and production operations can often require that electrical power be supplied to equipment in the downhole environment. For example, electrical power is required downhole for a number of applications, including well logging and telemetry. Well logging of the borehole often includes the use of sensors that require power to obtain information about the downhole environment. Such information will typically include the various characteristics and parameters of the earth formations traversed by the borehole, data relating to the size and configuration of the borehole itself, pressures and temperatures of ambient downhole fluids, and other relevant downhole parameters. Telemetry commonly utilizes electrical power to relay data acquired from various logging sensors in the downhole environment to the surface.

Once a borehole is completed into a hydrocarbon producing well, inflow control devices can be used to analyze produced fluids and formation conditions. Based on the results, control of the rate of fluid production can be desired. For example, an inflow control device may analyze the quantity of water production in relation to hydrocarbon production and restrict the total fluid production rate in order to limit the water/hydrocarbon ratio. The analysis and control devices can utilize electrical power in their operation and also in transmitting data to the surface.

One approach to generating power downhole utilizes circulating fluids to operate a downhole electric generator. The generation of electrical power downhole, however, can be problematic. For instance, fluid flow can be the driving force in downhole electrical generation, whether it is drilling fluids, completion fluids, produced fluids, or the like. These fluids are often not as clean as one would desire and may contain particulates that can act as debris and lead to issues within the relatively small clearances that downhole electrical generators may have. At least one problem with this approach is that particulates within the mud, produced fluids, or within a hydraulic fluid used to turn a rotor can build up as debris within the gap between a stator and rotor.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

FIG. 3 illustrates a block diagram of a downhole power generation system in accordance with an embodiment of the present disclosure.

FIG. 4 is a cross-sectional side view of an embodiment of an electrical generation system in which an energy source is coupled by way of an indirect magnetic coupling to a hydraulic pump within a housing, in accordance with an embodiment of the present disclosure.

FIG. 5 is a cross-sectional side view of an embodiment of an electrical generation system in which a fluid flow is the driving mechanism for electrical generation within a housing, in accordance with an embodiment of the present disclosure.

FIG. 6 is a perspective side view, showing components of an electrical generation system, in accordance with an embodiment of the present disclosure.

Figure 1:
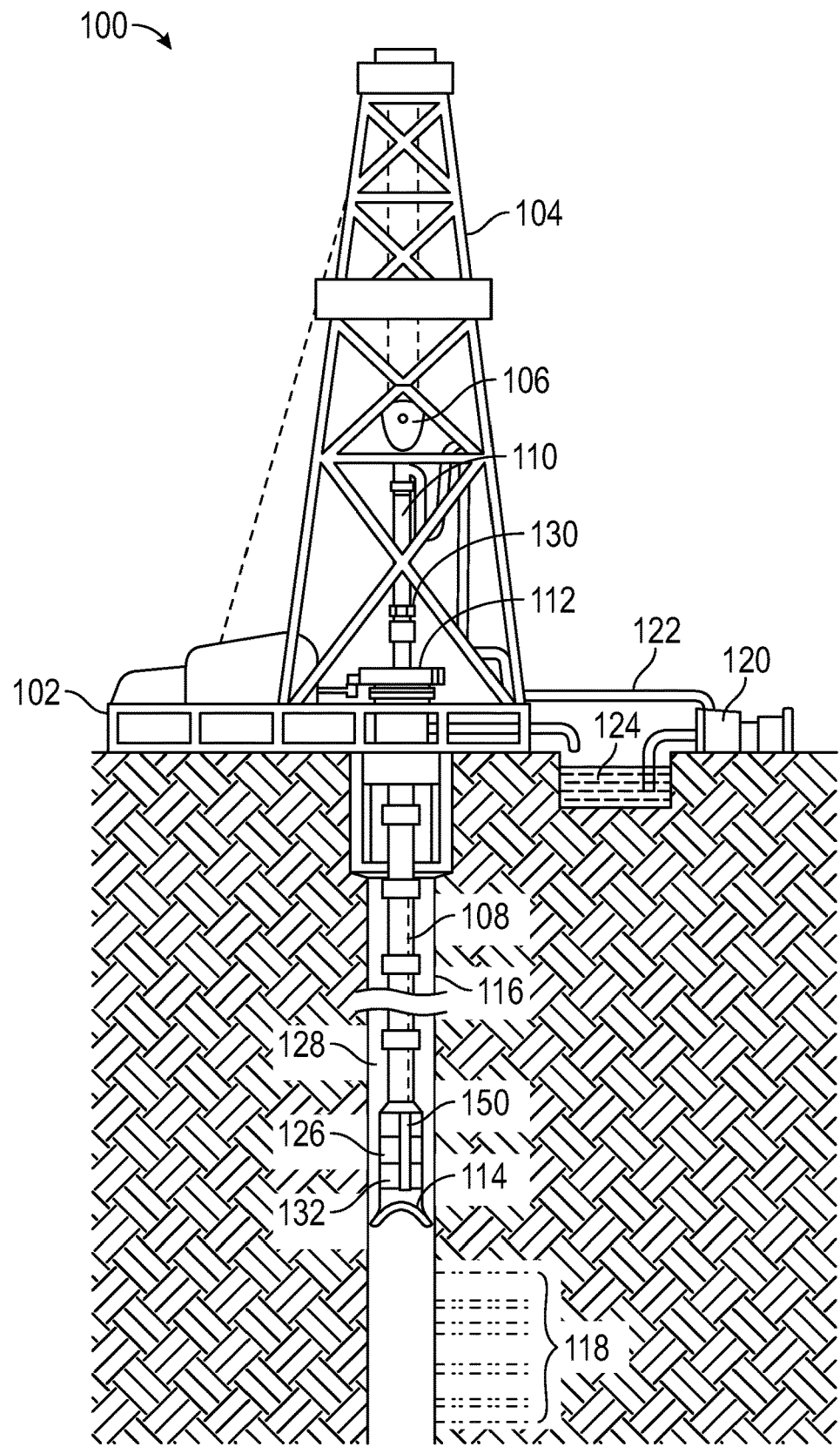
FIG. 1 illustrates a land-based oil and gas rig including a downhole power generation system in an illustrative logging environment according to an embodiment of the present disclosure.

While certain embodiments and aspects of the subject technology are depicted in the drawings, those skilled in the art will appreciate that the embodiments and aspects depicted are illustrative and that variations of those shown, as well as other embodiments and aspects described herein, may be envisioned and practiced within the scope of the present disclosure.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope or applications of the appended claims. In particular, an element associated with a particular embodiment should not be limited to association with that particular embodiment but should be assumed to be capable of association with any embodiment discussed herein.

Various elements of the embodiments are described with reference to their normal positions when used in a borehole. For example, a screen may be described as being below or downhole from a crossover. For vertical wells, the screen will actually be located below the crossover. For horizontal wells, the screen will be horizontally displaced from the crossover, but will be farther from the surface location of the well as measured through the well. Downhole or below as used herein refers to a position in a well farther from the surface location in the well.

The present disclosure relates generally to downhole power generation systems and methods and, more particularly, to downhole power generation systems and methods that utilize fluid flow to generate electrical power.

The disclosure provides alternative ways or methods to generate downhole electrical power. For example, the subject technology, as described herein, can provide for the generation of electrical power in a downhole environment by the use of an electrical generator coupled to a hydraulic circuit that receives energy from an energy source already present in the downhole environment. In one or more embodiments, the hydraulic circuit may be configured to receive an input of energy from flowing drilling fluid and/or from the angular kinetic energy derived from one or more portions of a rotating drill string. A direct or indirect coupling can be used to transfer the energy input to a hydraulic pump arranged in the hydraulic circuit. The hydraulic pump can act as a hydraulic flow source configured to provide fluid flow to an electric generator communicably coupled thereto for the generation of electricity. As another example, fluid flow from a producing formation can provide the input energy by being the driving force that rotates a rotor in a rotor/stator arrangement of a downhole power generation system. Within these various downhole power generation embodiments the ability to vary the gap between a rotor element and stator element can provide a means of reducing debris buildup and allowing any debris present to be removed by the flowing fluids.

Referring to the drawings in detail, wherein like numerals denote identical elements throughout the several views, there is shown in FIG. 1, a land-based drilling rig 100 including a downhole power generation system 150 that may be used in an illustrative wellbore application, according to the one or more embodiments. It should be noted that, even though FIG. 1 depicts a land-based rig 100, the exemplary downhole power generation system 150, and its various embodiments disclosed herein, are equally well suited for use in or on other types of rigs, such as offshore platforms or rigs arranged in any other geographical location.

As illustrated in FIG. 1, a drilling platform 102 supports a derrick 104 having a traveling block 106 for raising and lowering a drill string 108. A kelly 110 supports the drill string 108 as it is lowered through a rotary table 112. The kelly 110 is configured to transfer rotary motion to a turntable 130 and the drill string 108. A drill bit 114 is driven either by a downhole motor and/or via rotation of the drill string 108 from the well surface and may include one or more drill collars 126 arranged at or near the drill bit 114. As the bit 114 rotates, it creates a borehole 116 that passes through various subterranean formations 118. A pump 120 circulates drilling fluid through a pipe 122 to the kelly 110, which conveys the drilling fluid downhole through an interior flow conduit in the drill string 108 and through one or more orifices in the drill bit 114. The drilling fluid is then circulated back to the surface via an annulus 128 surrounding the drill string 108 where it is eventually returned to the surface and deposited in a pit 124. The drilling fluid transports cuttings and debris derived from the borehole 116 into the pit 124 and aids in maintaining the integrity of the borehole 116.

FIG. 1 also shows a tool 132 such as a logging while drilling tool within the drill string 108. In a simplified view, with the drill string 108 raised off the bottom of the borehole 116, the logging tool 132 may be configured to collect formation data such as resistivity, porosity, density, or conduct analysis of formation fluid samples. Alternatively, the logging may be performed as the drill string 108 is extracted from the borehole 116, thereby saving the time associated with performing a wireline logging operation after completely removing the drill string 108 from the borehole 116. Those skilled in the art will readily recognize that other drill rig configurations may be utilized with the downhole power generation systems and methods as described herein.

In one or more embodiments, the logging tool 132, and/or other downhole equipment, can be provided with electrical power using the downhole power generation system 150.

Figure 2:
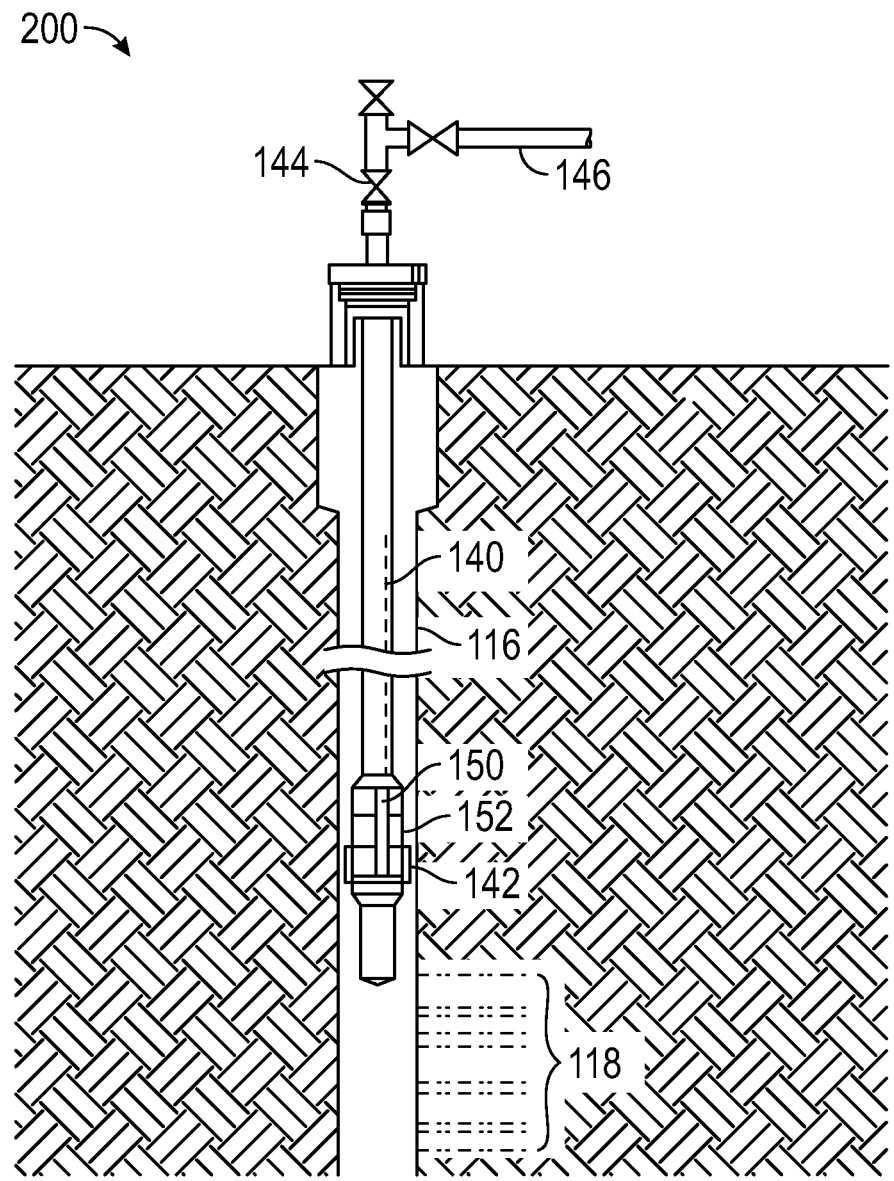
FIG. 2 illustrates a completed well that includes a downhole power generation system and an inflow control device according to an embodiment of the present disclosure.

Referring to FIG. 2, illustrated is a well 200, including a downhole power generation system 150 that may be employed with an illustrative inflow control device 152, according to the one or more embodiments. The well 200 is the well shown in FIG. 1, after completion for production of hydrocarbons from the subterranean formations 118. The well is produced through a conduit 140, such as production tubing or coiled tubing, which on the distal end is connected a packer 142, a downhole power generation system 150, and an inflow control device 152. Production of formation fluids proceeds through the tubing 140 to the surface where it passes through a wellhead 144 and out a production line 146. The inflow control device 152 can be used to analyze produced fluids and formation conditions, such as flow rate, temperature and pressure. Based on the results, control of the rate of fluid production may be desired. For example, the inflow control device may restrict the total fluid production rate in order to limit the water/hydrocarbon ratio from the formations. The analysis and control devices can utilize electrical power in their operation and also in transmitting data to the surface.

Referring now to FIG. 3, illustrated is a block diagram of the downhole power generation system 150, according to one or more embodiments of the disclosure. In some embodiments, the system 150 may include an energy source 202 communicably coupled to and configured to provide input energy to a power generation unit 207. The energy source 202, in at least one embodiment, may derive its input energy based on angular kinetic energy derived from a drive shaft 204, such as the drill string 108 of FIG. 1. In other embodiments, the energy source 202 may derive its input energy from a fluid-driven turbine 206 driven by, for example, the drilling fluid (i.e., mud) circulating in and out of the drill string 108. In other embodiments the energy source 202 is fluid flow 208 (i.e., mud, completion fluids, or produced fluids) that can directly power an electrical generator 218.

As depicted in FIG. 3, in one embodiment the power generation unit 207 may include a coupling 210 that communicably couples the energy source 202 to a hydraulic pump 212 arranged within a hydraulic circuit 209. The coupling 210 allows useful energy or power to be transferred from the energy source 202 to the hydraulic circuit 209. In some embodiments, the hydraulic circuit 209 may include one or more accessory devices 214, coupled to the hydraulic pump 212, and configured to receive hydraulic pressure from the hydraulic pump 212 in order to operate one or more of the hydraulic accessory devices 214. The hydraulic circuit 209 can provide hydraulic fluid flow to the electrical generator 218, such as to provide fluid flow to rotate a rotor in a rotor/stator type of electrical generator. In an alternate embodiment fluid flow 208, such as produced fluids as illustrated in FIG. 2, can provide the input energy to the electrical generator 218, to spin a rotor in a rotor/stator type of electrical generator.

Referring now to FIG. 4, illustrated is an exemplary power generation system 300, according to one or more embodiments. The power generation system 300 may be similar in some respects to the power generation system 150 of FIGS. 1 and 2. The power generation system 300 may receive input energy from the energy source 202 (not detailed) that, as discussed above, may include a fluid-driven turbine, a rotating driveshaft, or flowing fluids. The energy source 202 may be communicably coupled to the power generation system 300 using the coupling 210. In the illustrated embodiment, the coupling 210 may be an indirect magnetic coupling, but in other embodiments, the coupling 210 may be any other suitable coupling known to those skilled in the art, such as, but not limited to, direct sealed couplings.

The energy source 202 may be communicably coupled to the electrical generator 218, which may also be suitably arranged within the housing 302. In operation, the electrical generator 218 may be configured to be turned by the flowing fluids and thereby generate electrical power.

The power generation system 300 may include a hydraulic pump 212 and a hydraulic manifold 304 to circulate hydraulic fluid to power the electrical generator 218. It may also include control electronics 306 that may be arranged within a cavity defined in the housing 302. In operation, the control electronics 306 may be configured to control and/or otherwise condition the power generated by the electrical generator 218. In some embodiments, for example, the control electronics 306 may be configured to condition the generated electrical power delivery to various downhole tools, such as data loggers, telemetry devices/systems or flow control devices. The control electronics 306 can be physically located either above or below the electrical generator 218, depending on the overall design of the power generation system 300.

Referring now to FIG. 5, illustrated is another exemplary power generation system 300, according to one or more embodiments. The power generation system 300 may receive input energy from the energy source 202 being flowing fluids 208, as indicated by arrows. The flowing fluids 208, such as produced fluids flowing from a formation, can flow through a cavity defined in the housing 302 to the electrical generator 218, which may also be suitably arranged within the housing 302. In operation, the electrical generator 218 may be configured to have moving parts turned by the flowing fluids and thereby generate electrical power. It may also include control electronics 306 that may be arranged within a cavity defined in the housing 302. In operation, the control electronics 306 may be configured to control and/or otherwise condition the power generated by the electrical generator 218. The flowing fluids 208 can flow through a cavity 308 defined within the housing 302 to flow around the control electronics 306. The control electronics 306 can be physically located either above or below the electrical generator 218, depending on the overall design of the power generation system 300.

FIG. 6 is a perspective view of a rotor/stator assembly 400 of a permanent magnet electric generator in accordance with embodiments of the disclosure. A rotor 402 is shown having a plurality of permanent magnets 404 attached thereto. Note that the rotor 402 as shown does not have any blades showing, but blades typically will project outward radially from the rotor. The rotor 402 is positioned radially and able to rotate about a central shaft (not shown) that is located in the center of the rotor/stator assembly 400, as indicated by axis of rotation 406. Also shown is a stator 408 that includes flux guides 410. The stator 408 is also positioned radially about the axis of rotation 406 but is stationary in relation to the movable rotor 402 of the rotor/stator assembly 400. The rotor 402 and stator 408 are generally parallel to each other in a plane that is perpendicular to the axis of rotation 406 and are separated from each other by a gap 412.

Figure 7:
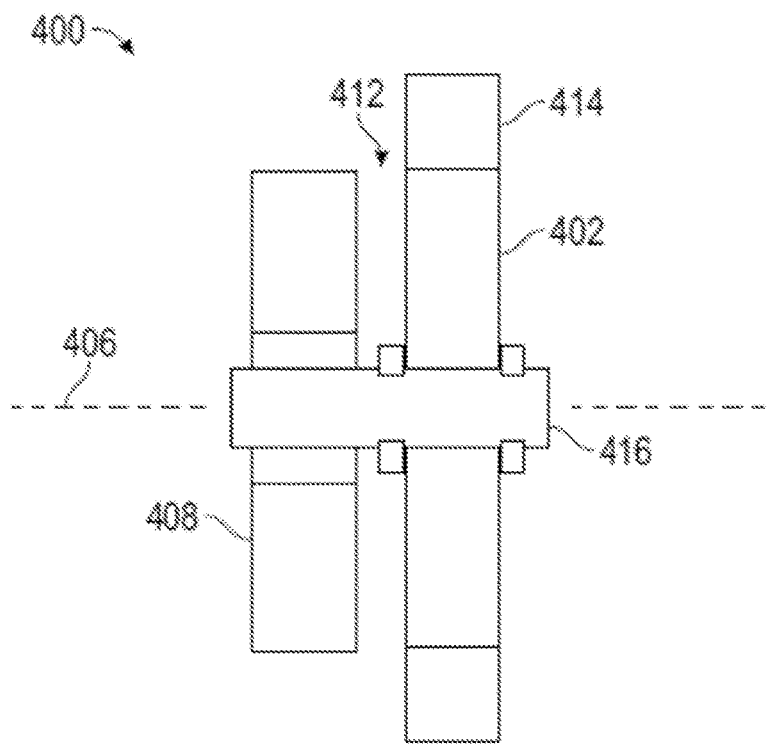
FIG. 7 is a simplified cross-sectional illustration of components of an electrical generation system, in accordance with an embodiment of the present disclosure.
Figure 8:
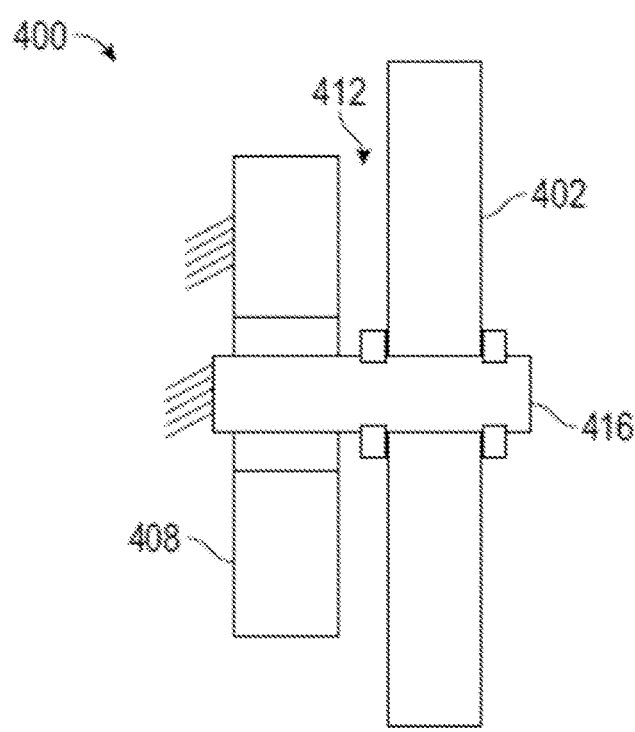
FIG. 8 is a simplified cross-sectional illustration of components of an electrical generation system, in accordance with an embodiment of the present disclosure.

For illustrative purposes the rotor/stator assembly 400 of FIG. 6 will be shown as the depiction of FIG. 7. A rotor 402 is shown having a plurality of blades 414 attached thereto projecting outward radially from the rotor. Note that the rotor 402 does not have any magnets showing, but magnets are located within or on the rotor 402. The rotor 402 is positioned radially and able to rotate about a central shaft 416 that is located in the center of the rotor/stator assembly 400, as indicated by axis of rotation 406. Also shown is a stator 408 that is also positioned radially about the axis of rotation 406 but is stationary. The rotor 402 and stator 408 are parallel to each other in a plane that is perpendicular to the axis of rotation 406 and their relative position to each other defines a gap 412.

Typically the stator 408 is fixed in place and the rotor 402 including magnets 404 and blades 414 rotate, thereby generating a magnetic field in an axial direction generally parallel to the rotational axis. The interaction between the rotating rotor and stationary stator generates an electrical current.

Figure 9:
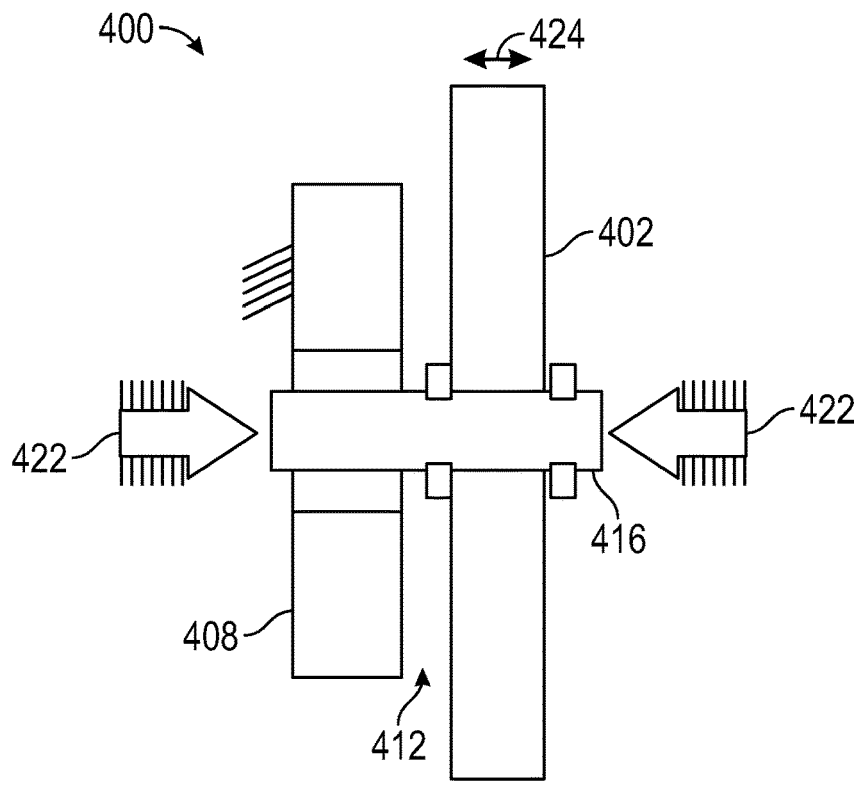
FIG. 9 is a simplified cross-sectional illustration of components of an electrical generation system, in accordance with an embodiment of the present disclosure.

An aspect of the current disclosure is to vary the size of the gap 412 between the rotor 402 and the stator 408. A smaller gap can generate more electricity for a given rpm, but a smaller gap is also easier to plug with debris. If the gap is able to be varied, the generator could vary between having a tendency to plug with debris (with a small gap) and washing out the debris (with a larger gap). One means to achieve this is by floating the shaft 416 and having it contained between two springs. As illustrated in the example of FIG. 9, the shaft 416 is supported by two springs 422 which allow the rotor 402 to move (illustrated as 424) along the axis of rotation 406 in relation to the stator 408. This defines a gap 412 that is variable. The magnetic field changes as the rotor turns and therefore the attraction between the rotor 402 and stator 408 will also change. The movement of the rotor 402 back and forth along the axis of rotation 406 will thus resist debris buildup within the gap 412.

Figure 10:
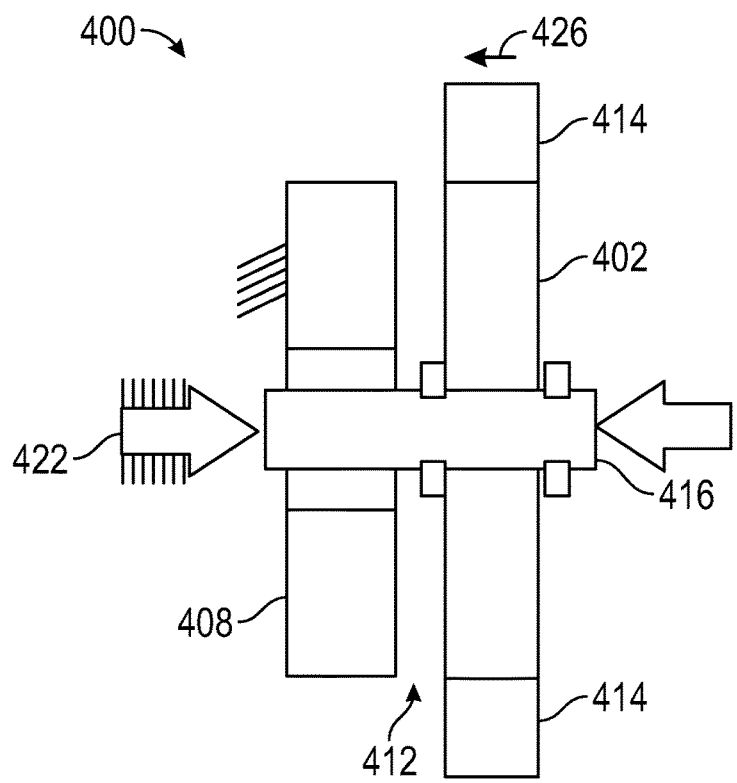
FIG. 10 is a simplified cross-sectional illustration of components of an electrical generation system, in accordance with an embodiment of the present disclosure.

In an alternative embodiment, the blades 414 on the rotor 402 can be tilted or otherwise shaped or positioned so that flow would bias the rotor 402 inward towards the stator 408 along the axis of rotation 406. As illustrated in FIG. 10, the shaft 416 of the rotor/stator assembly 400 can be supported by one spring 422 which allows the shaft 416 and rotor 402 to move along the axis of rotation 406 in relation to the stator 408. This defines a gap 412 that is variable. The blades 414 on the rotor 402 can be tilted so that flow would bias the rotor 402 towards the stator 408 upon fluid flow. As fluid flow changes, the force (shown as arrow 426) exerted by the tilted blades 414 will likewise change, resulting in the gap 412 between the rotor 402 and the stator 408 variable in size.

The movement of the rotor 402 in relation to the fluid flow will thus resist debris buildup within the gap 412.

When there is no flow the gap 412 should be at its largest, and with increased flow the force from the tilted blades 414 will make the gap 412 decrease. This variation can lead to where the gap 412 is small as long as there is flow. When flow reduces or stops the gap 412 increases and thus allows any debris to wash out, such at start up conditions. During startup conditions it would be preferable that the rotor 402 be maximum distance from the stator 408, thus providing a large gap 412. This can aid in flushing out any debris that may be located within the gap 412, and will also reduce the effect of attractive forces between the rotor 402 and stator 408. The rotor 402 would "free-wheel" as is it is being brought up to speed. Once turning, the rotor 402 would then move closure to the stator 408 and increase the attractive forces between the rotor 402 and stator 408. This works as a clutch mechanism. While it is possible to start the rotor 402 spinning with a small gap 412, it is easier to start the rotor 402 spinning while generating little power, when the gap 412 is larger.

Figure 11:
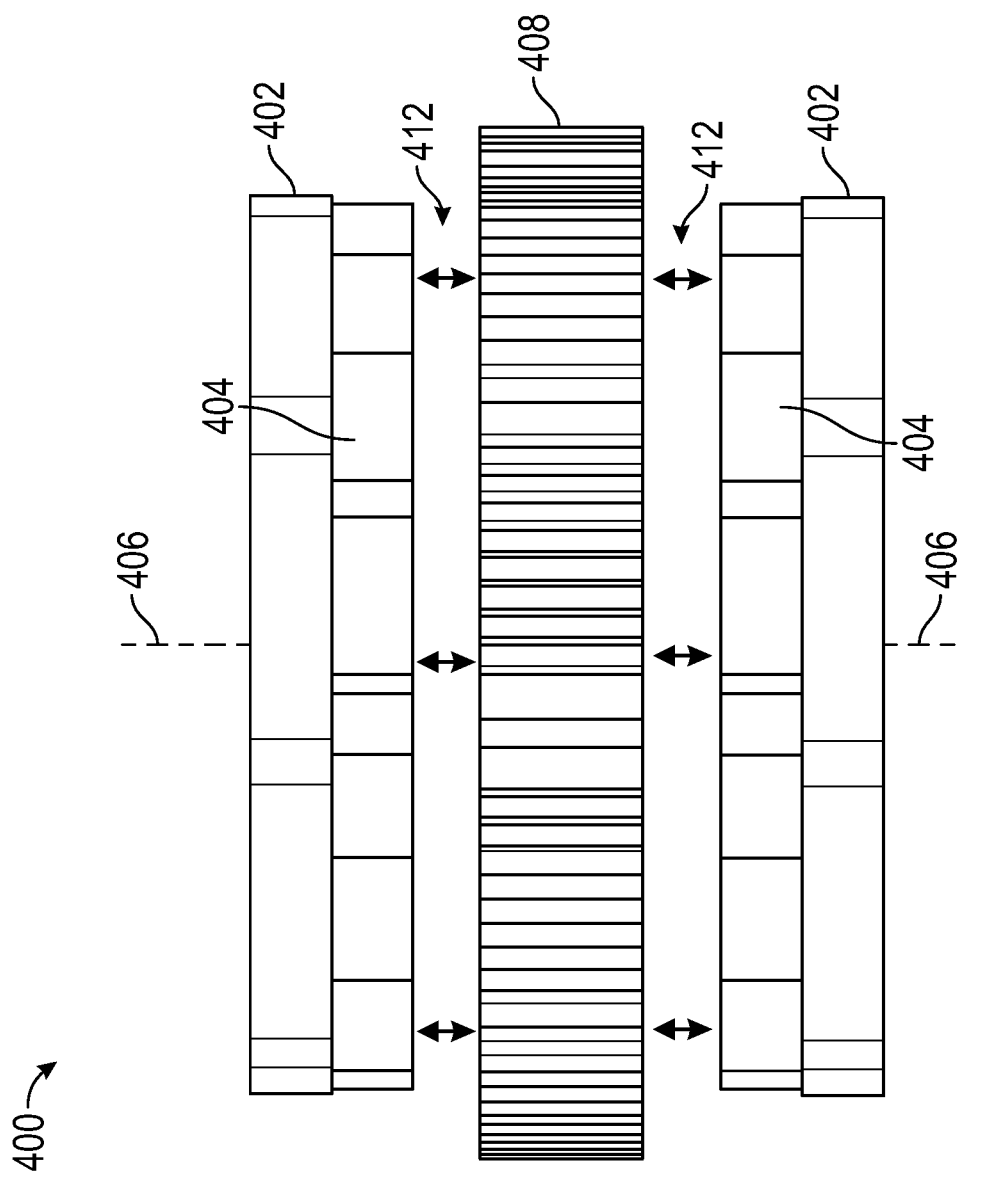
FIG. 11 is a perspective side view, showing components of an electrical generation system, in accordance with an embodiment of the present disclosure.
Figure 12:
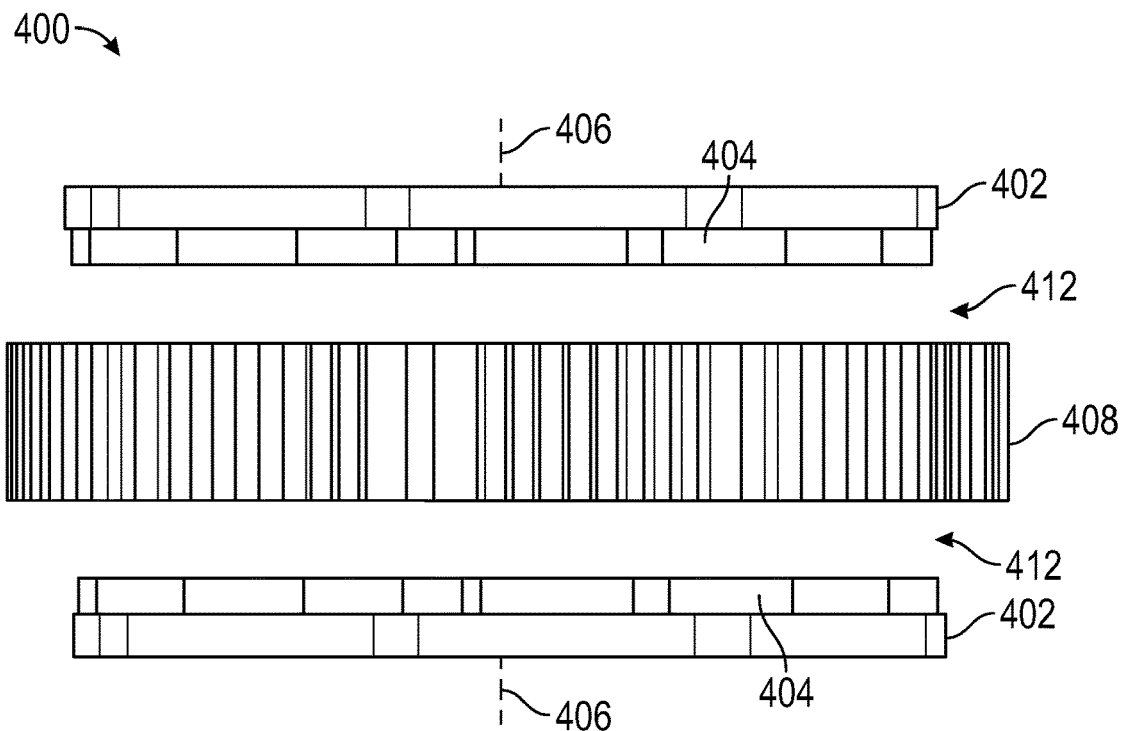
FIG. 12 is a perspective side view, showing components of an electrical generation system, in accordance with an embodiment of the present disclosure.

One disadvantage to the rotor/stator assembly 400 design as shown in FIG. 6 is that the rotor may be attracted to the non-rotating parts and this extra load is then taken up by the bearing. For example, there can be an attraction between the magnets 404 on the rotor 402, and the flux guides 410 associated with the stator 408. This attraction can lead to an unbalanced force on the bearing, and can lead to the premature failure of the bearing. In an embodiment, a double rotor arrangement as illustrated in FIG. 11. The attraction of the rotor 402 element, such as the magnets 404, to the non-rotating parts, such as the flux guides 410 associated with the stator 408, is thereby balanced. The arrangement of multiple rotors 402 as shown in FIG. 11 does result in increased thickness of the rotor/stator combination. In an effort to reduce the thickness, the two rotors 402 can be made thinner as shown in FIG. 12. The two rotors 402 can be joined together in a suitable manner, such as with a shaft and in an embodiment the joined rotor pair can be equipped with a common blade set. In an embodiment two or more rotors can be utilized and joined together. In an embodiment the joined rotors can be equipped with a single blade set, or multiple blade sets.

Figure 13:
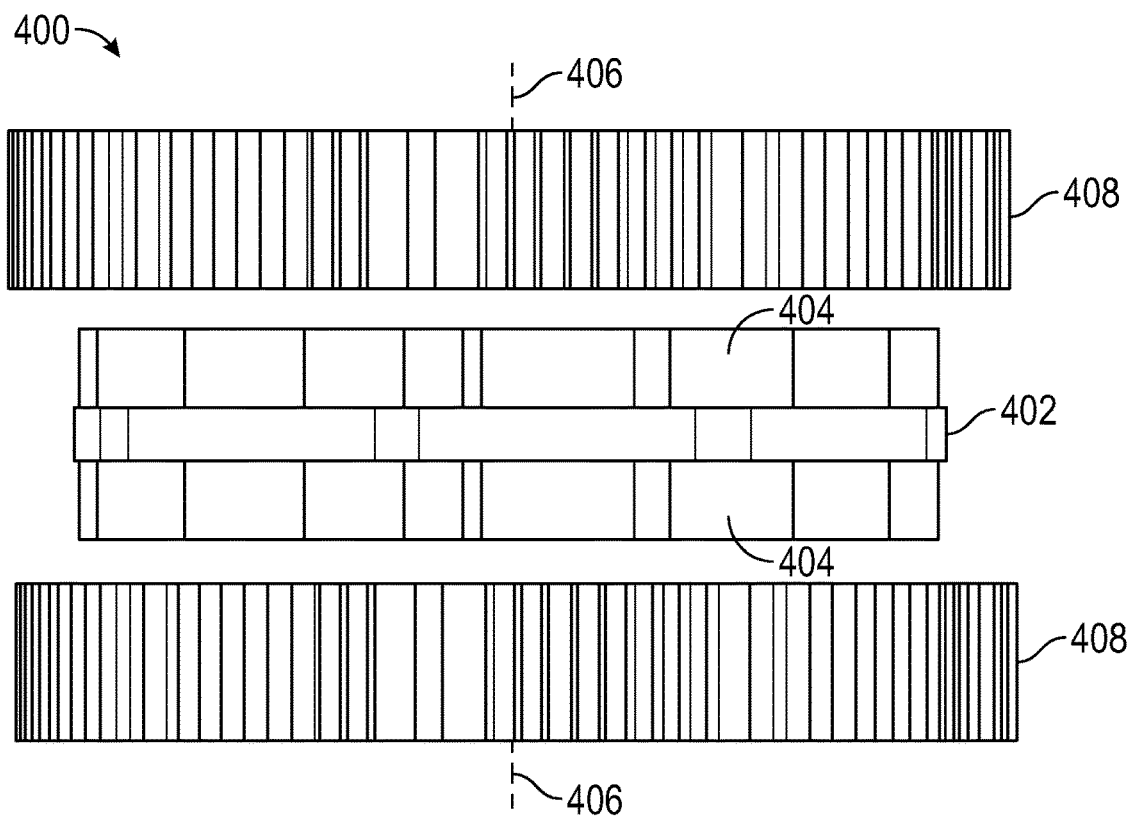
FIG. 13 is a perspective side view, showing components of an electrical generation system, in accordance with an embodiment of the present disclosure.

In an alternate embodiment of the rotor/stator assembly 400, the position of the rotor and stator can be reversed, with the rotor 402 sets located between two stator 408 sets, as shown in FIG. 13. The attraction of the rotor 402 to the non-rotating parts is thereby balanced.

Embodiments of the present disclosure are designed to be used in downhole applications. These downhole applications typically are in wellbores that have a restrictive diameter, thus restricting the size of the rotor/stator assembly. In an embodiment the rotor/stator assembly has a maximum diameter of 10 inches (254 mm), optionally 9 inches (229 mm), optionally 8 inches (203 mm), optionally 7 inches (178 mm), optionally 6 inches (153 mm), optionally 5 inches (127 mm), optionally 4 inches (102 mm), optionally 3 inches (76 mm), or optionally 2 inches (51 mm). In an embodiment the rotor/stator assembly has a maximum diameter of 3.0 inch (76.2 mm), optionally 2.7 inch (68.6 mm), 2.5 inch (63.5 mm), optionally 2.2 inch (55.9 mm), optionally 2.0 inch (50.8 mm), 1.9 inch (48.3 mm), optionally 1.8 inch (45.7 mm), optionally 1.7 inch (43.2 mm), optionally 1.6 inch (40.6 mm), optionally 1.5 inch (38.1 mm), optionally 1.4 inch (35.6 mm), optionally 1.3 inch (33.0 mm), optionally 1.2 inch (30.5 mm), optionally 1.1 inch (27.9 mm), or optionally 1.0 inch (25.4 mm).

In an embodiment the rotor/stator gap can range from 0.001 inch (0.025 mm) to 1.0 inch (25.4 mm), optionally 0.002 inch (0.051 mm) to 0.5 inch (12.7 mm), optionally 0.003 inch (0.076 mm) to 0.4 inch (10.2 mm), optionally 0.004 inch (0.102 mm) to 0.3 inch (7.62 mm), or optionally 0.005 inch (0.127 mm) to 0.2 inch (5.08 mm).

In an embodiment the power generated by the generator can range from 10 milliwatt (mW) to 10 W, optionally from 20 mW to 7 W, optionally from 30 mW to 5 W, optionally from 40 mW to 3 W, or optionally from 50 mW to 2 W.

An embodiment of the present disclosure is a downhole permanent magnet electric generator that includes a rotor rotatable about a rotational axis, the rotor having a generally planar shape extending in a radial direction generally perpendicular to the rotational axis a distance defining a rotor radius. One or more permanent magnets are attached to the rotor for generating a magnetic field. The magnetic field is parallel to the axis of rotation across the radial surface of the rotor. A stator having a generally planar shape extends in a radial direction generally perpendicular to the rotational axis a distance defining a stator radius. A shaft is connected to the rotor and also rotatable about the rotational axis, so that both the rotor and shaft are rotatable about the rotational axis. The rotational shaft extends through the stator though is not attached thereto. A linear distance along the shaft between the rotor and stator defines a gap that is variable and resistant to debris buildup.

The generator can include at least one spring supporting the shaft, wherein the shaft and rotor are movable in relation to the stator, thus providing a variable gap. The magnetic field can change as the rotor turns therefore the attraction between the rotor and stator can also change, thus providing a variable gap.

The generator can include blades projecting radially from the rotor, the blades being positioned so that fluid flow across the blades will bias the rotor towards the stator, thus providing a variable gap. The gap increases as fluid flow decreases, thus enabling debris to be washed from the gap. During a startup, when fluid flow is low, the gap will be at its maximum, and interaction between the rotor and stator will be at a minimum, thus making it is easier to start the rotor spinning.

The generator can include a bearing supporting the shaft and two rotors positioned on opposing sides of the stator, the double rotor arrangement balancing the attractions of the rotors to the stator and reducing forces on the bearing. Alternately there can be a bearing supporting the shaft and two stators positioned on opposing sides of the rotor, the double stator arrangement balancing the attractions of the rotor to the stators and reducing forces on the bearing.

In an embodiment the generator can include a rotor/stator arrangement, including the blades, having a maximum diameter of 5.0 inch (127 mm), optionally 4.5 inch (114.3 mm), optionally 4.0 inch (101.6 mm), 3.5 inch (88.9 mm), optionally 3.0 inch (76.2 mm), optionally 2.7 inch (68.6 mm), 2.5 inch (63.5 mm), optionally 2.2 inch (55.9 mm), optionally 2.0 inch (50.8 mm), 1.9 inch (48.3 mm), optionally 1.8 inch (45.7 mm), optionally 1.7 inch (43.2 mm), optionally 1.6 inch (40.6 mm), optionally 1.5 inch (38.1 mm), optionally 1.4 inch (35.6 mm), optionally 1.3 inch (33.0 mm), optionally 1.2 inch (30.5 mm), optionally 1.1 inch (27.9 mm), or optionally 1.0 inch (25.4 mm).

An alternate embodiment is a downhole power generation system that includes a fluid flow and an electrical generator driven by the fluid flow. The electrical generator has a rotor rotatable about a rotational axis, a stator, and a shaft connected to the rotor and rotatable about the rotational axis extending through the stator. A linear distance along the shaft between the rotor and stator defines a gap that is variable. The fluid flow rotates the rotor within the electrical generator and generates electrical power.

The fluid flow that rotates the rotor within the electrical generator can be fluid circulated through a tubular string disposed within a wellbore, or can be fluid produced from a subterranean formation, or alternately can be fluid flow from a pump, the pump driven by a rotating tubular within a wellbore.

The text above describes one or more specific embodiments of a broader disclosure. The disclosure also is carried out in a variety of alternate embodiments and thus is not limited to those described here. The foregoing description of an embodiment of the disclosure has been presented for the purposes of illustration and description. It is not intended to be exhaustive or to limit the disclosure to the precise form disclosed. Many modifications and variations are possible in light of the above teaching. It is intended that the scope of the disclosure be limited not by this detailed description, but rather by the claims appended hereto.

The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein.

All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A downhole permanent magnet electric generator comprising:
    a rotor rotatable about a rotational axis, the rotor having a generally planar shape extending in a radial direction generally perpendicular to the rotational axis a distance defining a rotor radius;
    one or more permanent magnets attached to the rotor for generating a magnetic field;
    a stator having a generally planar shape extending in a radial direction generally perpendicular to the rotational axis a distance defining a stator radius;
    a shaft connected to the rotor and rotatable about the rotational axis, the shaft attached to the rotor wherein both the rotor and shaft are rotatable about the rotational axis, the rotational shaft extending through the stator though not attached thereto; and
    a linear distance along the shaft between the rotor and stator that defines a gap;
    wherein the gap is variable and resistant to debris buildup, the gap configured to increase or decrease in a direction generally parallel with the rotational axis.

2. The generator of claim 1 further comprising at least one spring supporting the shaft, wherein the shaft and rotor are translatable along the rotational axis in relation to the stator, thus providing the variable gap.

3. The generator of claim 1 wherein the magnetic field will change as the rotor turns therefore the attraction between the rotor and stator will also change, thus providing the variable gap.

4. The generator of claim 1 further comprising blades projecting radially from the rotor, the blades positioned so that fluid flow across the blades will bias the rotor towards the stator, thus providing the variable gap.

5. The generator of claim 4 wherein the gap increases as fluid flow decreases, thus enabling debris to be washed from the gap.

6. The generator of claim 4 wherein during a startup, fluid flow is low, the gap is at its maximum, and interaction between the rotor and stator is at a minimum, thus it is easier to start the rotor spinning.

7. The generator of claim 4 wherein a combination of the rotor, stator and any blades has a maximum diameter of 3 inches.

8. The generator of claim 1 further comprising a bearing supporting the shaft and two rotors positioned on opposing sides of the stator, the double rotor arrangement balancing the attractions of the rotors to the stator and reducing forces on the bearing.

9. The generator of claim 1 further comprising a bearing supporting the shaft and two stators positioned on opposing sides of the rotor, the double stator arrangement balancing the attractions of the rotor to the stators and reducing forces on the bearing.

10. A downhole power generation system comprising:
    a fluid flow;
    an electrical generator driven by the fluid flow;
    the electrical generator comprising:
        a rotor rotatable about a rotational axis, a stator, a shaft connected to the rotor and rotatable about the rotational axis extending through the stator, a linear distance along the shaft between the rotor and stator that defines a gap, wherein the gap is variable, the gap configured to increase or decrease in a direction generally parallel with the rotational axis;
    wherein the fluid flow rotates the rotor within the electrical generator and generates electrical power.

11. The downhole power generation system of claim 10 wherein the fluid flow that rotates the rotor within the electrical generator is fluid circulated through a tubular string disposed within a wellbore.

12. The downhole power generation system of claim 10 wherein the fluid flow that rotates the rotor within the electrical generator is fluid produced from a subterranean formation.

13. The downhole power generation system of claim 10 wherein the fluid flow that rotates the rotor within the electrical generator is fluid flow from a pump, the pump driven by a rotating tubular within a wellbore.

14. The downhole power generation system of claim 10 further comprising at least one spring supporting the shaft, wherein the shaft and rotor are movable in relation to the stator, thus providing the variable gap.

15. The downhole power generation system of claim 14 further comprising a bearing supporting the shaft and two rotors positioned on opposing sides of the stator, the double rotor arrangement balancing the attractions of the rotors to the stator and reducing forces on the bearing.

16. The downhole power generation system of claim 14 further comprising a bearing supporting the shaft and two stators positioned on opposing sides of the rotor, the double stator arrangement balancing the attractions of the rotor to the stators and reducing forces on the bearing.

17. The downhole power generation system of claim 10 wherein the magnetic field will change as the rotor turns therefore the attraction between the rotor and stator will also change, thus providing the variable gap.

18. The downhole power generation system of claim 10 further comprising blades projecting radially from the rotor, the blades positioned so that fluid flow across the blades will bias the rotor towards the stator, thus providing the variable gap.

19. The downhole power generation system of claim 18 wherein the gap increases as fluid flow decreases, thus enabling debris to be washed from the gap.

20. The downhole power generation system of claim 18 wherein during a startup, fluid flow is low, the gap is at its maximum, and interaction between the rotor and stator is at a minimum, thus it is easier to start the rotor spinning.

\* \* \* \* \*

UNITED STATES PATENT AND TRADEMARK OFFICE
CERTIFICATE OF CORRECTION

PATENT NO. : 12,018,549 B2
APPLICATION NO. : 16/829975
DATED : June 25, 2024
INVENTOR(S) : James Dan Vick, Jr. and Richard Decena Ornelaz Page 1 of 1

It is certified that error appears in the above-identified patent and that said Letters Patent is hereby corrected as shown below:

On the Title Page

After:
"Prior Publication Date
US 2020/036267 A1 Nov. 19, 2020"

Insert:
--Foreign Application Priority Data
May 14, 2019 WO ............PCT/US2019/032256--

Signed and Sealed this
Third Day of September, 2024

Katherine Kelly Vidal
*Director of the United States Patent and Trademark Office*